(12) United States Patent
Kimura et al.

(10) Patent No.: US 8,628,841 B2
(45) Date of Patent: Jan. 14, 2014

(54) CERAMIC GREEN BODY AND METHOD FOR PRODUCING THE SAME

(75) Inventors: Koji Kimura, Nagoya (JP); Takuji Kimura, Kariya (JP); Tetsuya Onogi, Nagoya (JP); Hidemi Nakagawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 511 days.

(21) Appl. No.: 12/544,424

(22) Filed: Aug. 20, 2009

(65) Prior Publication Data

US 2010/0055436 A1    Mar. 4, 2010

(30) Foreign Application Priority Data

Aug. 27, 2008 (JP) ................................. 2008-217681

(51) Int. Cl.
*B32B 3/00* (2006.01)
*B32B 7/00* (2006.01)
*B32B 17/00* (2006.01)
*B32B 18/00* (2006.01)

(52) U.S. Cl.
USPC ........... 428/210; 428/292; 428/325; 428/339; 428/423.1

(58) Field of Classification Search
USPC ............ 428/423.1, 210, 325, 292, 339; 264/621, 632, 635; 524/590, 591; 528/48, 58, 52, 53, 85
See application file for complete search history.

(56) References Cited

U.S. PATENT DOCUMENTS

| 4,353,958 | A | 10/1982 | Kita et al. |
| 4,496,509 | A | 1/1985 | Kita et al. |
| 4,630,963 | A | 12/1986 | Wyman |
| 7,517,490 | B2 * | 4/2009 | Miyazawa .................... 264/621 |
| 8,034,402 | B2 * | 10/2011 | Namerikawa et al. ....... 427/96.2 |
| 2005/0212185 | A1 | 9/2005 | Miyazawa |
| 2008/0255308 | A1 * | 10/2008 | Austrup et al. ............... 525/124 |
| 2009/0091062 | A1 * | 4/2009 | Ohashi et al. ................. 264/299 |

FOREIGN PATENT DOCUMENTS

| CA | 2168616 A1 * | 8/1996 | ............ C04B 35/634 |
| DE | 38 43 221 C1 | 11/1989 | |
| EP | 0 727 400 A1 | 8/1996 | |
| EP | 2 243 758 A1 | 10/2010 | |
| GB | 2 121 024 A1 | 12/1983 | |
| JP | 58-190867 A1 | 11/1983 | |
| JP | 02-307861 A1 | 12/1990 | |
| JP | 08-092555 A1 | 4/1996 | |
| JP | 11-106643 A1 | 4/1999 | |
| JP | 11-322442 A1 | 11/1999 | |
| JP | 2001-270772 A1 | 10/2001 | |
| JP | 2003246677 * | 9/2003 | ............ C04B 35/622 |
| JP | 2006-121012 A | 5/2006 | |
| JP | 2007-099889 A1 | 4/2007 | |

OTHER PUBLICATIONS

U.S. Appl. No. 12/366,715, filed Feb. 6, 2009, Kimura et al.

* cited by examiner

*Primary Examiner* — Michael L Leonard
(74) *Attorney, Agent, or Firm* — Burr & Brown, PLLC

(57) ABSTRACT

The ceramic slurry is prepared by mixing a ceramic powder, a solvent, a dispersion medium, an isocyanate, a polyol, and a catalyst for accelerating a urethane reaction between the isocyanate and the polyol. A temperature-sensitive catalyst, which substantially exhibits a catalyst function only within a specific temperature range including an active temperature and higher than room temperature, is used as the catalyst. In a solidifying and drying step performed after a molding step of the slurry at room temperature, the solidification/drying temperature is set to be a high temperature within the range (within the specific temperature range) relatively close to the active temperature of the temperature-sensitive catalyst, and this temperature is maintained. Thus, the catalyst function can sufficiently be exhibited under high temperature.

5 Claims, 5 Drawing Sheets

FIG.1

Isocyanate molecule  
Mi: Molecular weight  
Ri: Content

Polyol molecule  
Mp: Molecular weight  
Rp: Content

⇩ Reaction

Urethane resin molecule

Repeating-unit-based molecular weight $Mu = \dfrac{Mi}{Ri} + \dfrac{Mp}{Rp}$

Drying

CERAMIC GREEN BODY AND METHOD FOR PRODUCING THE SAME

CROSS-REFERENCE TO RELATED APPLICATION

This application claims priority under 35 USC §119(a)-(d) to Japanese Patent Application No. 2008-217681, filed Aug. 27, 2008.

FIELD OF THE INVENTION

The present invention relates to a ceramic green body and to a method for producing the same and, more particular, to a ceramic green body containing a urethane resin (polyurethane) and a method for producing the same.

BACKGROUND OF THE INVENTION

Hitherto, there have widely been known methods in which a plurality of ceramic green sheets each containing a ceramic powder and an organic binder are formed and subjected to processes such as mechanical working, printing, stacking, and firing, to thereby produce a variety of finished products. Japanese Patent Application Laid-Open (kokai) No. 2006-121012 discloses such a method.

Conventionally, ceramic green sheets are generally produced by the following technique. First, a ceramic powder is mixed with a solvent, a dispersion medium, and an organic binder, thereby preparing a ceramic slurry, and the ceramic slurry is molded into a plate-like sheet through known techniques such as sheet molding, cast molding, injection molding, for example, the doctor blade method. The product molded into plate-like shape is dried to evaporate the solvent, thereby producing a plate-like ceramic green sheet.

SUMMARY OF THE INVENTION

With ceramic green sheets exhibiting a large percent (heat) shrinkage, high positioning accuracy is difficult to obtain, in the cases of, for example, printing or drying of ceramic green sheets and stacking of a plurality of ceramic green sheets. Thus, there is demand for reduction of heat-induced percent shrinkage of ceramic green sheets. Furthermore, in order to facilitate subsequent processes such as mechanical working and firing, ceramic green sheets are required to satisfy plasticity (i.e., cracking resistance to bending), punching property (i.e., resistance to cracking in a section formed by punching), and sinterability (ease of dense sintering).

The present inventors have found that a ceramic green sheet having the above-mentioned all properties in a balanced manner can be provided with the use of a urethane resin as an organic binder (refer to Japanese Patent Application No. 2008-37157). In this case, a ceramic slurry is prepared by mixing an isocyanate and a polyol, which are used to produce a urethane resin through a urethane reaction, with a ceramic powder. The ceramic slurry is added with a catalyst that exhibits a catalyst function for accelerating the urethane reaction. A catalyst (hereinafter referred to as "ordinary catalyst") exhibiting the catalyst function for accelerating the urethane reaction even at room temperature is generally used as the catalyst.

Figure 5A:
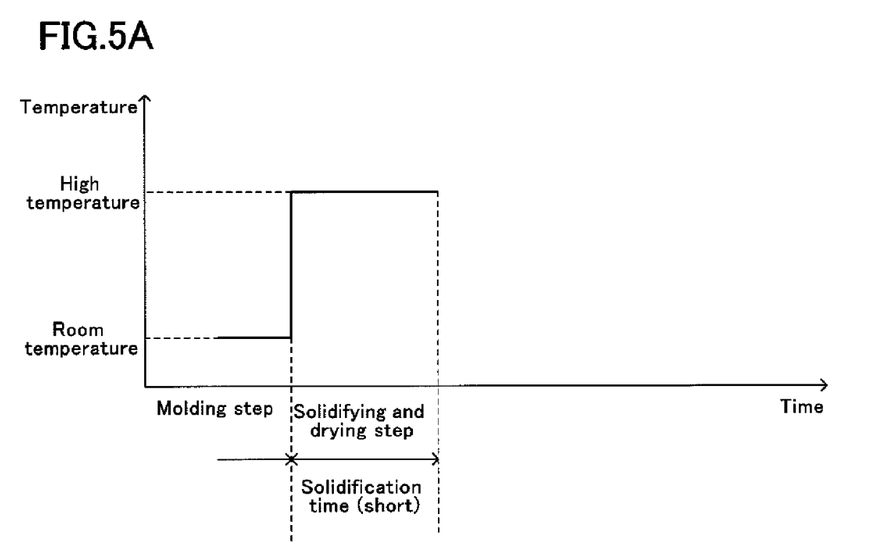
FIG. 5A is a diagram illustrating the case in which the temperature of a molded product is kept to be a high temperature in the solidifying and drying step of the molded product in order to shorten the time taken for the solidifying and drying, when a conventional ordinary catalyst is used.

The case in which the ordinary catalyst is added to the ceramic slurry described below is considered, for example. Specifically, after a molding step of the ceramic slurry is performed at room temperature, the molded product is heated to have high temperature (e.g., 100° C.), and a solidifying and drying step is performed with the high temperature maintained in order to shorten the time (solidification time) required for the solidifying and drying step of the molded product, as shown in FIG. 5A. The solidification time is defined as a duration time of the solidifying and drying step required to solidify the molded product to such a degree that the molded product is not easily broken when the molded product is gripped or picked up by means of, for example, a hand or jig.

Figure 5B:
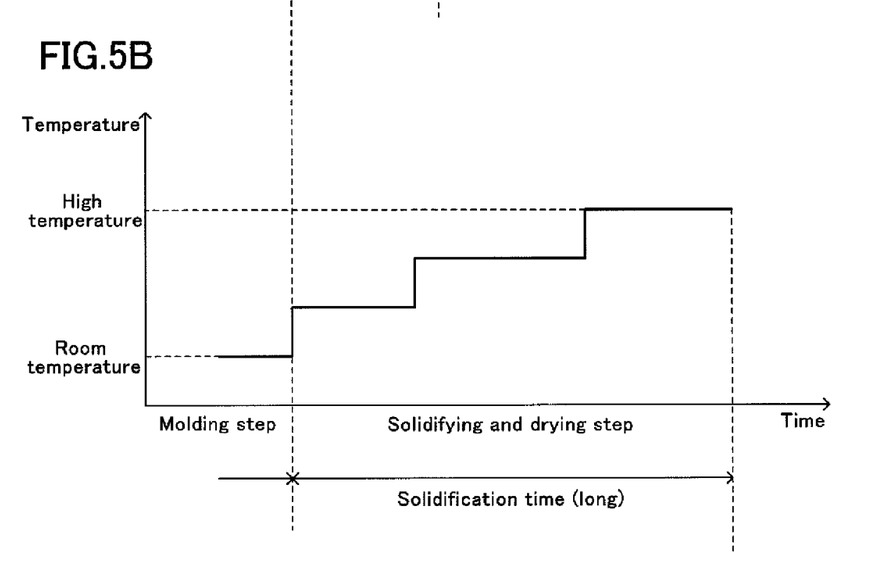
FIG. 5B is a diagram illustrating the case in which the temperature of the molded product is stepwise increased from room temperature to a high temperature in accordance with the progression of the solidifying and drying step of the molded product in order to prevent cracks from being produced on the molded product, when a conventional ordinary catalyst is used.

In this case, as shown in FIG. 5A, it has been found that the solidification time is shortened, but cracks are likely to be produced on the molded product. In order to prevent the generation of the cracks, the temperature of the molded product may be stepwisely increased in the solidifying and drying step from the room temperature to the high temperature in accordance with the progression of the solidifying and drying step as shown in FIG. 5B. In this case, the generation of the cracks is prevented, but the problem of the relatively increased solidification time arises as shown in FIG. 5B.

Thus, provision of a ceramic green sheet, which can shorten the time taken for the solidifying and drying step and which can prevent cracks from being generated on a molded product, is desired, in case where a catalyst exhibiting a catalyst function for accelerating a urethane reaction is added in a ceramic slurry using a urethane resin as a binder.

The present invention is accomplished in view of the above-mentioned problem, and a ceramic green body according to the present invention is produced through the following procedure. First, a ceramic powder, an isocyanate, a polyol, a temperature-sensitive catalyst that exhibits a catalyst function for accelerating a urethane reaction between the isocyanate and the polyol within a specific temperature range that includes an active temperature (the temperature at which the catalyst-reaction speed becomes the maximum) and that is higher than room temperature, and a solvent are mixed to prepare a ceramic slurry. The ceramic slurry contains the ceramic powder, an unreacted portion of the isocyanate, an unreacted portion of the polyol, and the solvent, or further contains a urethane resin serving as a binder formed through the urethane reaction (ceramic slurry preparing step).

It is preferable that the temperature-sensitive catalyst having the active temperature of 55 to 120° C. is used (specific ingredients of the temperature-sensitive catalyst will be described later). The specific temperature range is, for example, 35 to 140° C. It is preferable that the additive amount of the temperature-sensitive catalyst added in the ceramic slurry is within the range of 0.15 to 1.0 parts by weight with respect to 100 parts by weight of the ceramic powder.

Next, the prepared ceramic slurry is molded into a predetermined shape at room temperature (molding step). In the molding step, a plate-like ceramic green sheet having a thickness of 4 mm or less may be molded, and a ceramic green sheet having a greater thickness may be formed.

The molded product is heated, whereby the temperature of the molded product is kept to be within the specific temperature range (solidifying and drying step). Thus, the urethane resin is further produced through the urethane reaction between the unreacted isocyanate and the unreacted polyol in the molded product, whereby the molded product is solidified, and dried to thereby evaporate the solvent.

The present inventors have found that the time taken for the solidifying and drying step can relatively be shortened, and cracks are difficult to be generated on the molded product because of the catalyst function, when the "temperature-sensitive catalyst" is used instead of the "ordinary catalyst" as the catalyst for accelerating the urethane reaction, and the temperature of the molded product is kept to be within the specific temperature range (e.g., high temperature such as 100° C.) in the solidifying and drying step. Thus, the ceramic green body (having a satisfactory appearance) having no cracks generated can be produced in a relatively short period.

The ceramic green body produced as described above can be described as "a ceramic green body containing a ceramic powder; a urethane resin serving as a binder and formed through a urethane reaction between an isocyanate and a polyol; and a temperature-sensitive catalyst that exhibits a catalyst function for accelerating the urethane reaction within a specific temperature range including an active temperature (the temperature at which the catalyst-reaction speed becomes the maximum) and that is higher than room temperature, the ceramic green sheet being molded into a predetermined shape, wherein, after the molding of a ceramic slurry, which is obtained by mixing at least the ceramic powder, the isocyanate, the polyol, and the temperature-sensitive catalyst, at room temperature, the molded product is solidified and dried in the state in which the molded product is heated and the temperature of the molded product is kept to be within the specific temperature range".

It is supposed below that the ceramic green body described above (or a ceramic green sheet) is mass-produced. In this case, a method in which the ceramic slurry is prepared in a required amount, every time the ceramic slurry is needed, for the subsequent molding step and the solidifying and drying step. However, in this case, the ceramic slurry has to be prepared every time it is needed. Therefore, when the ceramic green body is mass-produced, the number of times of preparing the ceramic slurry becomes enormous, which makes the operation of preparing the ceramic slurry troublesome.

On the other hand, a method can be employed in which a ceramic slurry prepared in large quantity is stored in a predetermined vessel at room temperature, and a small amount of the ceramic slurry is taken out at a time from the vessel in a required amount when it is needed, and used for the subsequent molding step and the solidifying and drying step.

The temperature-sensitive catalyst is difficult to exhibit the catalyst function at room temperature, different from the ordinary catalyst. Therefore, in the state in which the ceramic slurry is stored at room temperature, the solidification of the ceramic slurry, which is caused by the urethane reaction, is difficult to progress. Accordingly, even when the ceramic slurry in large quantity is kept in a vessel at room temperature for a relatively long period, the ceramic slurry can be used for the subsequent molding step. When the ordinary catalyst is used, the urethane reaction is unfavorably accelerated due to the catalyst function at room temperature (the slurry is solidified). Therefore, the ceramic slurry described above cannot be kept for a long time at room temperature.

The method described above is based upon the finding described above. Accordingly, when the ceramic green body is mass-produced, a ceramic slurry in large quantity can be prepared at a time and can be kept for a long time, whereby the number of times of preparing the ceramic slurry can be reduced. Consequently, man-hours for the operation of preparing the ceramic slurry can be reduced.

DETAILED DESCRIPTION OF THE INVENTION

Hereinafter, an embodiment of the method for producing a ceramic green sheet according to the present invention will be described with reference to the drawings.

In this embodiment, the ceramic green sheet is generally produced through the following procedure.

Step 1: adding a solvent and a dispersant to a ceramic powder with mixing, to thereby prepare a ceramic slurry precursor.

Step 2: adding a polyol, an isocyanate, and a catalyst to the ceramic slurry precursor prepared in step 1 with mixing, to thereby prepare a ceramic slurry. The steps 1 and 2 correspond to the "ceramic slurry preparing step".

Step 3: molding the ceramic slurry prepared in step 2 into a plate-like sheet. This step 3 corresponds to the "molding step".

Step 4: solidifying and drying the molded product (plate-like sheet) prepared in step 3, to thereby form a urethane resin, and evaporating the solvent off the molded product. This step 4 corresponds to the "solidifying and drying step".

Through the above procedure, a ceramic green sheet is produced. As described above, the solvent, the dispersant, the isocyanate and polyol (which form urethane resin via urethane reaction), and the catalyst for accelerating urethane reaction are added as organic ingredients of the ceramic slurry. These organic ingredients impart plasticity and shape retainability to a ceramic material, which is a material having no plasticity, and are decomposed and removed through sintering (firing), thereby not remaining in a sintered product (final product). The respective steps will next be described in more detail.

Details of Step 1:

The ceramic powder may be formed of an oxide ceramic material or a non-oxide ceramic material. Examples of such ceramic materials include alumina ($Al_2O_3$), zirconia ($ZrO_2$), barium titanate ($BaTiO_3$), nickel oxide (NiO), cerium oxide ($CeO_2$), gadolinium oxide ($Gd_2O_3$), silicon nitride ($Si_3N_4$), silicon carbide (SiC), aluminum nitride (AlN), and glass powder. These materials may be used singly or in combination of two or more species. No particular limitation is imposed on the particle size of the ceramic material, so long as a slurry can be prepared from the ceramic material.

No particular limitation is imposed on the species of solvent, so long as the solvent can dissolve the aforementioned dispersant, isocyanate, polyol, and catalyst. For example, solvent species each having two or more ester bonds such as esters of polybasic acids (e.g., dimethyl glutarate) and acid esters of polyhydric alcohols (e.g., triacetin) are preferably employed.

Examples of preferably employed dispersants include polycarboxylic acid copolymers and polycarboxylic acid salts. Through addition of such a dispersant, the slurry before molding has lowered viscosity and increased fluidity.

As described above, the ceramic slurry precursor is prepared by adding the solvent and the dispersant to the ceramic powder at predetermined proportions, and mixing and grinding them for a predetermined period of time. This step 1 is performed at room temperature.

Figure 1:
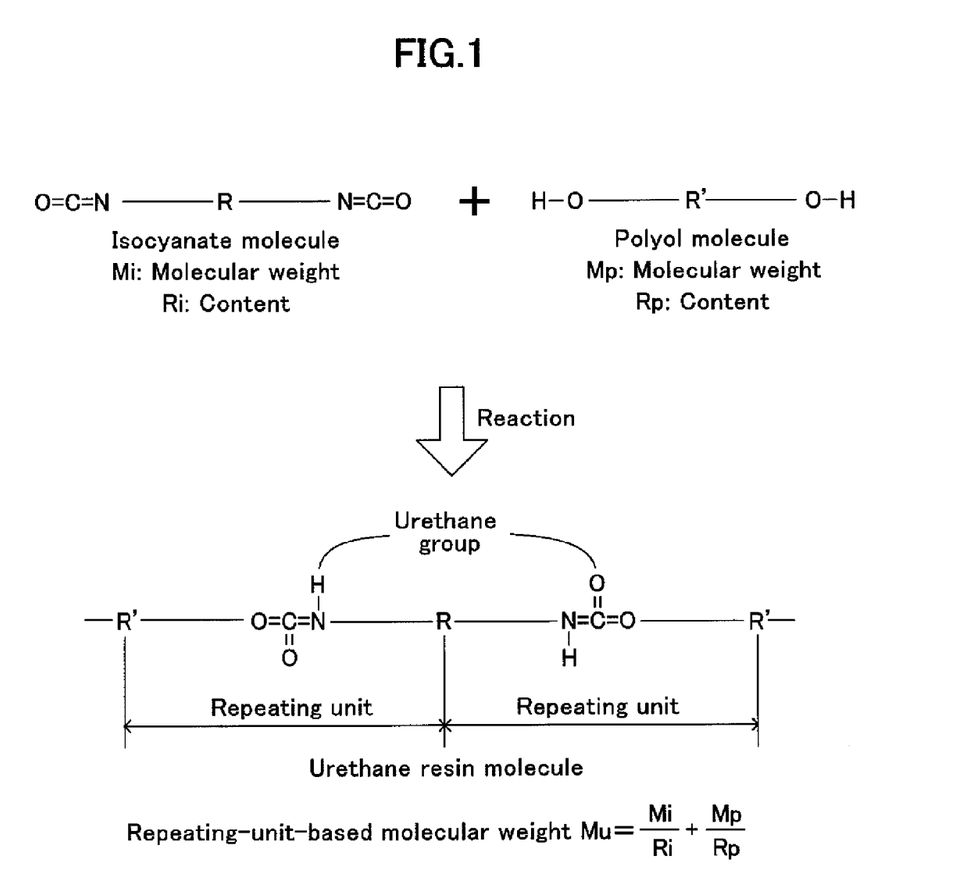
FIG. 1 schematically illustrates the repeating-unit-based molecular weight of a molecule of a urethane-resin serving as an organic binder in a ceramic green sheet according to an embodiment of the present invention.

Details of Step 2:

As shown in FIG. 1, after molding of the slurry, the isocyanate and the polyol contained in the slurry undergo urethane reaction, to thereby produce a urethane resin (polyurethane) serving as an organic binder. No particular limitation is imposed on the species of isocyanate, so long as the substance has an isocyanate group serving as a functional group. Examples of the substance include tolylene diisocyanate (TDI), diphenylmethane diisocyanate (MDI), and modified products thereof. A reactive functional group other than isocyanate group may be contained in the molecule of each substance. Furthermore, a plurality of reactive functional groups may be contained in the molecule of each substance as in the case of polyisocyanates.

No particular limitation is imposed on the species of polyol, so long as the polyol has a functional group reactive with an isocyanate group; such as a hydroxyl group or an amino group. Examples of the polyol include ethylene glycol (EG), polyethylene glycol (PEG), propylene glycol (PG), polypropylene glycol (PPG), polytetramethylene glycol (PTMG), polyhexamethylene glycol (PHMG), and polyvinyl butyral (PVB).

A temperature-sensitive catalyst that exhibits a catalyst function (catalyst activity) for accelerating the urethane reaction is used as the catalyst. The temperature-sensitive catalyst means a catalyst that is hard to exhibit the catalyst function at room temperature, but exhibits a catalyst function only within a temperature range higher than room temperature, specifically, only within a specific temperature range including an active temperature. The temperature-sensitive catalyst is greatly different, in this point, from the above-mentioned ordinary catalyst exhibiting the catalyst function even at room temperature. The active temperature means the temperature at which the catalyst-reaction speed becomes the maximum (at which the catalyst function can fully be exhibited) in this embodiment. In this embodiment, the temperature-sensitive catalyst having the active temperature of 55 to 120° C. is used.

Examples of the temperature-sensitive catalyst include a block catalyst formed by partly or entirely neutralizing an amine catalyst with an organic acid, a thermoactive catalyst in which an amine catalyst is formed through sealing and application of heat at room temperature, a catalyst whose catalyst activity is increased due to the reduction in a steric barrier of molecule because of the application of heat, the approach of electron pair to a nitrogen atom, the reduction in a hydrogen bond, or the like.

Specific examples of the temperature-sensitive catalyst include diazabicycloalkene having amidino group [$H_2NC(=NH)$—] such as 1,8-diazabicyclo(5.4.0)undecene-7(DBU), 1,5-diazabicyclo(4.3.0)nonene-5(DBN), etc., imidazoles such as triethylene diamine, bis(2-dimethylaminoethyl)ether, dimethylcyclohexyl amine, 1-methylimidazole, 1,2-dimethylimidazole, 1-isobutyl-2-methylimidazole, etc., organic acid salt of tertiary amine compound such as N,N,N',N'-tetramethylethylenediamine, N,N,N',N'-tetramethylhexamethylenediamine, N,N,N',N''N''-pentamethyldiethylene triamine, etc.

As described above, the isocyanate, the polyol, and the catalyst (temperature-sensitive catalyst) are added to the ceramic slurry precursor, followed by mixing and degassed in vacuum, whereby a ceramic slurry is prepared. This step 2 is also performed at room temperature. Therefore, the catalyst function of the temperature-sensitive catalyst is hard to be exhibited at this stage, so that the urethane reaction hardly progresses in the slurry.

Details of Step 3:

The above-described ceramic slurry is molded into a plate-like sheet through a known technique. For example, the ceramic slurry is molded into a plate-like sheet having a thickness of 4 mm or less, by a sheet-molding machine employing a doctor blade. This step 3 is also performed at room temperature. Therefore, the catalyst function of the temperature-sensitive catalyst is also hard to be exhibited at this stage, so that the urethane reaction hardly progresses in the molded product.

Details of Step 4:

The above-described sheet (molded product) is heated and/or left to stand within the specific temperature range for solidification and drying. The solidification and drying of the sheet may be performed by heating the sheet inside the sheet-molding machine. By solidification and drying, solvent is evaporated off the sheet (molded product), while the ceramic slurry (sheet) is solidified via the acceleration of the urethane reaction caused by the exhibition of the catalyst reaction, whereby a ceramic green sheet (final product) is produced. Organic ingredients (e.g., solvent, dispersion medium, catalyst, urethane resin) remaining in the ceramic green sheet are removed from the sheet via decomposition, evaporation, etc., during subsequent sintering.

(Operation and Effect Obtained by Adding Temperature-Sensitive Catalyst)

Subsequently, an operation and effect obtained by using the temperature-sensitive catalyst as the catalyst for accelerating the urethane reaction will be described. It has been found that, when the temperature-sensitive catalyst is used as the catalyst, the time (solidification time) taken for the step 4 (solidifying and drying step) can be shortened, and cracks are difficult to be produced on the molded product (sheet) at step 4. The solidification time is defined as a duration time of the solidifying and drying step required to solidify the molded product to such a degree that the molded product is not easily broken when the molded product is gripped or picked up by means of, for example, a hand or jig.

Figure 2:
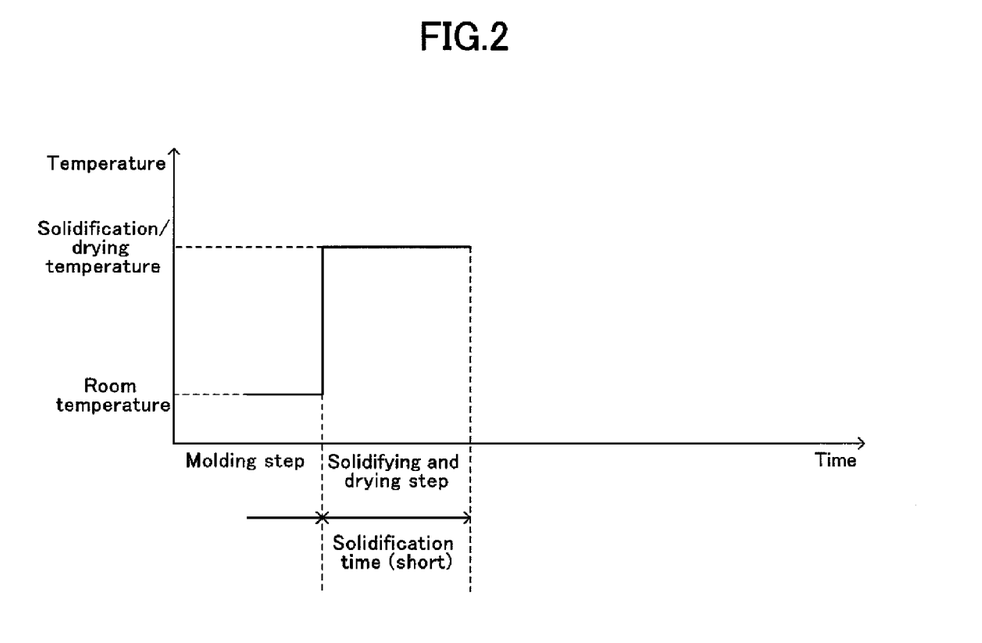
FIG. 2 is a view illustrating that a molding step is performed at room temperature, and a solidifying and drying step is performed at a solidification/drying temperature (high temperature)

The above finding was confirmed by an experiment, which will be described below. In this experiment, as shown in FIG. 2, after the molding step (step 3) of a ceramic slurry at room temperature, a molded product was heated on a hot plate, and the solidifying and drying step (step 4) was conducted in a state in which the temperature of the molded product was kept to be fixed at the solidifying/drying temperature (100° C. in the present embodiment). Thus, the solidification time was measured, and whether the cracks were produced or not was confirmed.

The measurement of the solidification time and the confirmation as to whether the cracks were produced or not were repeatedly carried out, while changing the types of the catalyst as shown in Table 1. Table 1 shows the result of the case in which the additive amount of the temperature-sensitive catalyst added into the slurry is 0.25 parts by weight (constant) with respect to 100 parts by weight of the ceramic powder. The appearance of (X) means that the cracks were produced, while the appearance of (O) means that the cracks were not produced.

TABLE 1

| Type of catalyst | Active temperature (° C.) | Appearance |
|---|---|---|
| Ordinary catalyst | Room temperature | X |
| Temperature-sensitive catalyst A | 40 | X |
| Temperature-sensitive catalyst B | 55 | O |
| Temperature-sensitive catalyst C | 55 | O |
| Temperature-sensitive catalyst D | 80 | O |
| Temperature-sensitive catalyst E | 90 | O |
| Temperature-sensitive catalyst F | 90 | O |
| Temperature-sensitive catalyst G | 120 | O |

Additive amount of catalyst: 0.25 parts by weight
Solidifying/drying temperature: 100° C.

Even when any one of the catalysts described in Table 1 was used, the solidification time was sufficiently short such as 20 minutes or less. This is based upon the operation in which the urethane reaction is accelerated because of the high solidifying/drying temperature such as 100° C. However, only when the ordinary catalyst was used, and only when the temperature-sensitive catalyst A was used, cracks were produced on the molded product.

The reason because the cracks were produced only in the case of two catalysts is as described below. Specifically, in the solidifying and drying step, there arise two phenomena, that is the phenomenon (hereinafter referred to as a first phenomenon) in which the molded product is solidified because of the urethane reaction, and a phenomenon (hereinafter referred to as a second phenomenon) in which the solvent is evaporated.

In the cases using the catalysts other than the two catalysts, it is considered that the temperature-sensitive catalyst was used, and the solidifying/drying temperature (=100° C.) was relatively close to the active temperature of the temperature-sensitive catalyst, so that the catalyst function of the temperature-sensitive catalyst was sufficiently exhibited in the solidifying and drying step. In other words, it is considered that the first phenomenon progresses faster than the second phenomenon in this case. The molded product becomes a relatively strong base with the solidification of the molded product in this case. Thereafter, the inter-molecular distance between the molecules of urethane resin is reduced with the evaporation of the solvent, with the result that the molded product is apt to shrink. However, the molded product has already become a relatively strong base. Accordingly, it is considered that the cracks are difficult to occur, even when an internal stress is applied due to the shrinkage described above.

On the other hand, the cases using two catalysts described above are assumed. In this case, since the ordinary catalyst (active temperature: room temperature) and the temperature-sensitive catalyst A (active temperature: 40° C.) have low active temperature, it is estimated that the urethane-reaction speed at high temperature such as about 100° C. is lower than that in the vicinity of the active temperature. In other words, the second phenomenon progresses faster than the first phenomenon in this case. The molded product tends to shrink as described above before the molded product becomes a relatively strong base in this case. Consequently, it is conceived that cracks are easy to occur due to the generation of internal stress caused by the shrinkage.

From the above, when the temperature-sensitive catalyst is used as the catalyst for accelerating the urethane reaction (and the solidifying/drying temperature in the solidifying and drying step is set within the range (within the "specific temperature range") relatively close to the active temperature of the temperature-sensitive catalyst), the time (solidification time) taken for the solidifying and drying step can relatively be shortened, and cracks are difficult to be generated on the molded product (sheet). Therefore, a ceramic green sheet (having a satisfactory appearance) having no cracks generated can be produced in a relatively short period.

It is preferable that the solidifying/drying temperature in the solidifying and drying step is set to be within the range of 35 to 140° C. Next, the optimum additive amount of the temperature-sensitive catalyst added in the ceramic slurry has been studied. The additive amount of the temperature-sensitive catalyst greatly affects the solidification time. The result of the experiment conducted for confirming this finding will be described below.

Figure 3:
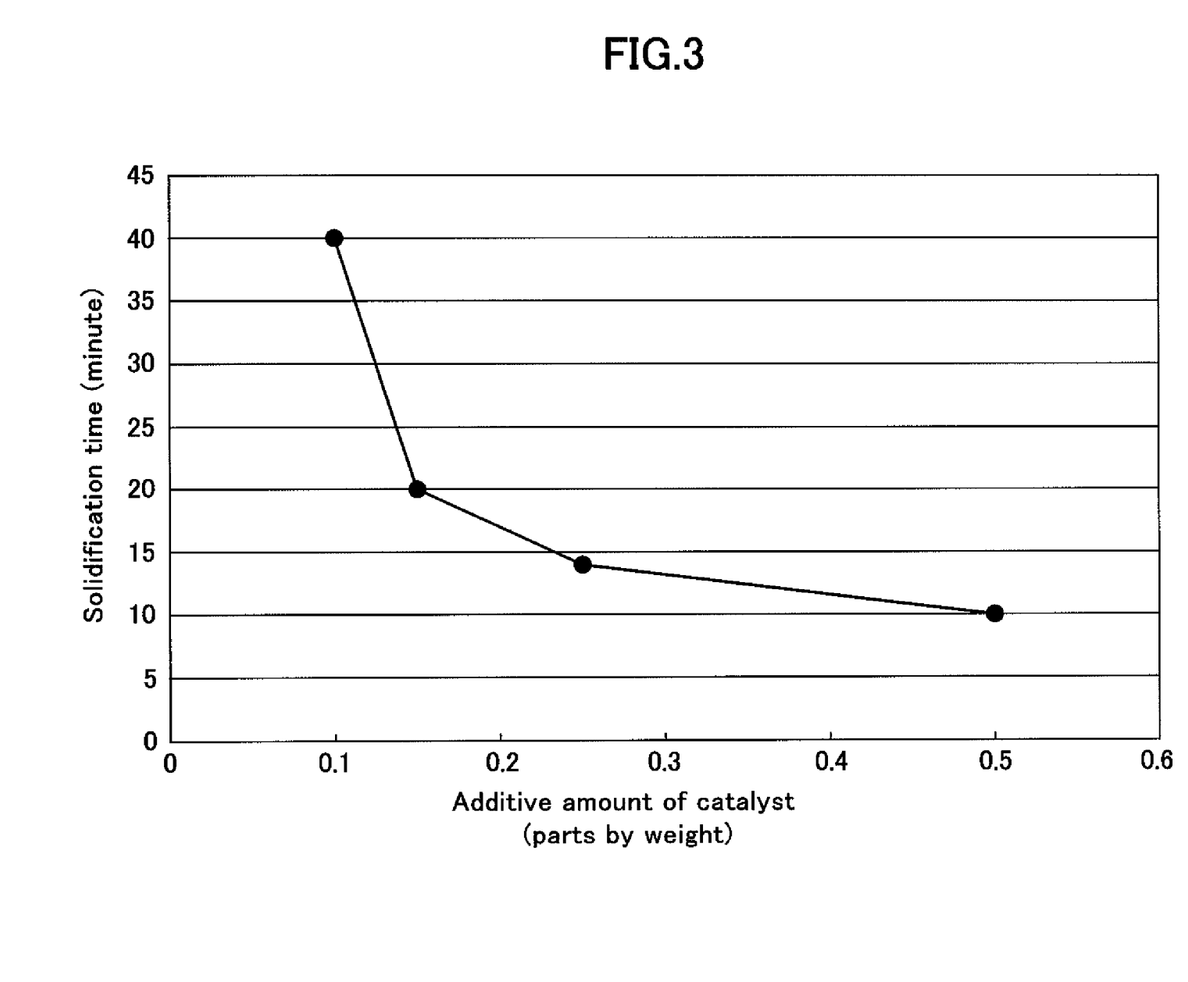
FIG. 3 is a graph illustrating a relationship between an additive amount of a catalyst added to a ceramic slurry and a solidification time in the solidifying and drying step.

Table 2 shows the result of the measurements in the experiment in which the solidification time was measured under the condition that temperature-sensitive catalyst E was used as the temperature-sensitive catalyst, and the solidifying/drying temperature was set to 100° C. (constant), while changing the additive amount of the temperature-sensitive catalyst. FIG. 3 is a graph showing the result of the measurement shown in Table 2. The additive amount (parts by weight) of the temperature-sensitive catalyst is the value with respect to 100 parts by weight of the ceramic powder.

TABLE 2

| Type of catalyst | Additive amount of catalyst (parts by weight) | Solidification time (min.) |
|---|---|---|
| Temperature-sensitive catalyst E | 0.05 | — |
|  | 0.1 | 40 |
|  | 0.15 | 20 |
|  | 0.25 | 14 |
|  | 0.5 | 10 |
|  | 1 | — |

Solidifying/drying temperature: 100° C.

As can be understood from Table 2 and FIG. 3, the solidification time is sufficiently short when the additive amount of the temperature-sensitive catalyst is within the range of 0.15 to 0.5 parts by weight. On the other hand, when the additive amount of the temperature-sensitive catalyst is less than 0.15 parts by weight, the solidification time rapidly increases. When the additive amount of the temperature-sensitive catalyst exceeds 1.0 part by weight, the catalyst function of the temperature-sensitive catalyst is excessively exhibited, so that the urethane reaction is easy to excessively accelerated, thus non-preferable. From the above, it is conceived that the additive amount of the temperature-sensitive catalyst added in the ceramic slurry is preferably within the range of 0.15 to 1.0 parts by weight with respect to 100 parts by weight of the ceramic powder.

As described above, in case where the catalyst for accelerating the urethane reaction is added into the ceramic slurry employing the urethane resin is used as a binder, when the temperature-sensitive catalyst is used and the solidifying/drying temperature in the solidifying and drying step is set within the range (within the "specific temperature range") relatively close to the active temperature of the temperature-sensitive catalyst, the time taken for the solidifying and drying step can be shortened, and cracks are difficult to be generated on the molded product (sheet). Therefore, a ceramic green sheet (having a satisfactory appearance) having no cracks generated can be produced in a relatively short period.

In the embodiment described above, a plate-like ceramic green sheet having a thickness of 4 mm or less is employed as the ceramic green body. However, it is estimated that the similar operation and effect can be provided even if a ceramic green body having a more complicated shape is employed.

It is supposed below that the ceramic green body according to the present embodiment is mass-produced. In this case, a method in which the ceramic slurry is prepared in a required amount, every time the ceramic slurry is needed, for the subsequent molding step and the solidifying and drying step. However, in this case, the ceramic slurry has to be prepared every time it is needed. Therefore, when the ceramic green body is mass-produced, the number of times of preparing the ceramic slurry becomes enormous, which makes the operation of preparing the ceramic slurry troublesome.

On the other hand, a method can be employed in which a ceramic slurry prepared in large quantity is stored in a predetermined vessel at room temperature, and a small amount of the ceramic slurry is taken out at a time from the vessel in a required amount when it is needed, and used for the subsequent molding step and the solidifying and drying step.

This is based upon the reason described below. Specifically, when the ordinary catalyst described above is used, the urethane reaction is unfavorably accelerated (the slurry is solidified) due to the exhibition of the catalyst function at room temperature. Therefore, the ceramic slurry containing the ordinary catalyst cannot be kept for a long time at room temperature. On the other hand, the temperature-sensitive catalyst is difficult to exhibit the catalyst function at room temperature, different from the ordinary catalyst. Therefore, in the state in which the ceramic slurry is stored at room temperature, the solidification of the ceramic slurry, which is caused by the urethane reaction, is difficult to progress. Accordingly, even when the ceramic slurry in large quantity is kept in a vessel at room temperature for a relatively long period, the ceramic slurry can be used for the subsequent molding step.

Accordingly, in case where the method in which a small amount of the ceramic slurry is taken out, when needed, from a vessel in a required amount when the ceramic green body is mass-produced, a ceramic slurry in large quantity can be prepared at a time and can be kept for a long time, whereby the number of times of preparing the ceramic slurry can be reduced. Consequently, man-hours for the operation of preparing the ceramic slurry can be reduced.

Figure 4A:
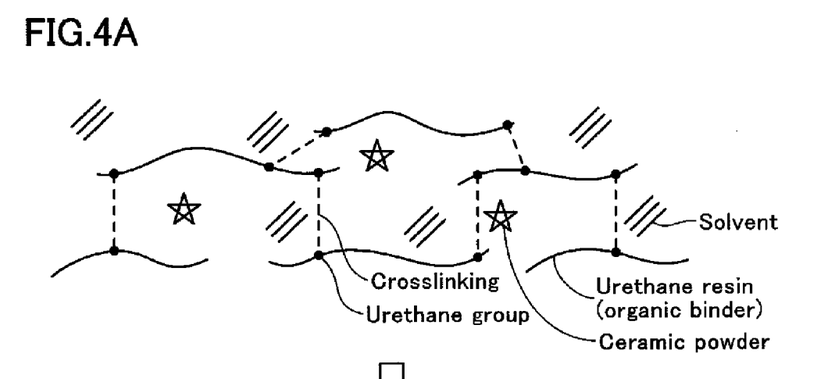
FIGS. 4A and 4B are diagrams showing the status of crosslinking attained by use of a urethane resin as an organic binder in the ceramic green sheet according to the embodiment of the present invention, before heating (i.e., before evaporation of residual solvent) and that after heating (i.e., after evaporation), respectively.
Figure 4B:
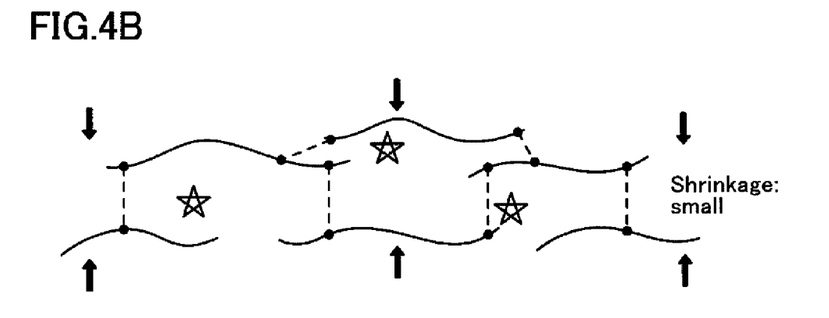

Hereinafter, the aforementioned case where urethane resin is employed as an organic binder will be described in more detail. As shown in FIG. 4, crosslinking occurs between adjacent molecules of the urethane resin with the progress of gelling as described above, so that urethane groups contained in the respective molecules of the urethane resin are linked to each other.

The crosslinking can form a network which links the molecules of the urethane resin. As a result, a decrease in inter-molecular distance in the polyurethane resin (organic binder) contained in the sheet is suppressed, even when evaporation of residual solvent progresses in a process which involves heating.

The shorter the distance between adjacent ones of a plurality of the urethane groups contained in the respective molecules of the urethane resin (hereinafter the distance is referred to as urethane-group distance), the denser the network. Accordingly, the sheet tends to exhibit a lower percent (heat) shrinkage and an enhanced punching property. However, the plasticity tends to decrease. In other words, the longer the urethane-group distance, the coarser the network. Accordingly, the sheet tends to exhibit a higher percent (heat) shrinkage and a deteriorated punching property. However, the plasticity tends to increase.

As shown in FIG. 1, the molecular weight of the urethane resin (hereinafter referred to as repeating-unit-based molecular weight: Mu) is defined by the following formula (1):

$$Mu = (Mi/Ri) + (Mp/Rp) \qquad (1)$$

In formula (1), Mi denotes the molecular weight of an isocyanate group which is contained in an isocyanate used for the preparation of a slurry; Mp denotes the molecular weight of a hydroxyl group which is contained in a polyol used for the preparation of the slurry; Ri denotes the isocyanate group content of the isocyanate used for the preparation of the slurry; and Rp denotes the hydroxyl group content of the polyol used for the preparation of the slurry.

The repeating-unit-based molecular weight (Mu) as defined above corresponds to the molecular weight of one repeating unit in the urethane resin molecule shown in FIG. 1. Thus, the repeating-unit-based molecular weight (Mu) is a value representing the urethane-group distance and, therefore, the larger (smaller) the Mu, the longer (shorter) the urethane-group distance. In other words, with increasing (decreasing) of the repeating-unit-based molecular weight (Mu), percent (heat) shrinkage becomes larger (smaller), the punching property is more deteriorated (is more enhanced), and plasticity is more enhanced (more deteriorated).

In addition, when an excessive number of urethane resin molecules exist in the ceramic green sheet (i.e., the ratio by weight of urethane resin to ceramic powder in the ceramic green sheet is excessively large), the inter-particle distance of the ceramic powder excessively increases. Thus, the ceramic green sheet tends to exhibit an inferior sinterability during sintering. In contrast, when the ratio by weight of urethane resin to the ceramic powder in the sheet is excessively low, the inter-molecular distance between urethane resin molecules increases excessively. Thus, the binder function of the urethane resin deteriorates, so that the shape retainability after drying tends to deteriorate.

As described above, ceramic green sheets are required to have plasticity, punching property, and sinterability and to exhibit a low percent (heat) shrinkage, in order to facilitate subsequent processes of the sheets such as mechanical working and firing.

The present inventors' studies have revealed that a ceramic green sheet having plasticity, punching property, and sinterability and exhibiting a low percent (heat) shrinkage can be provided under the following conditions. Specifically, in the polyol and the isocyanate employed for the preparation of a slurry, the functional-group ratio of polyol to isocyanate falls within a range of 2/11.5 to 5/11.5. The repeating-unit-based molecular weight (Mu) of the urethane resin falls within a range of 290 to 988. The ratio by weight of urethane resin to ceramic powder contained in the ceramic green sheet falls within a range of 7 to 10 parts by weight of the urethane resin based on 100 parts by weight of the ceramic powder.

The above finding was confirmed by an experiment, which will be described hereunder. First, zirconia powder ($ZrO_2$; 100 parts by weight) serving as a ceramic powder, a mixture of triacetin and an organic dibasic acid ester (1:9) (20 parts by weight) serving as a solvent, and a polycarboxylic acid copolymer (3 parts by weight) serving as a dispersant were provided. These materials were mixed and ground for 12 hours by means of a ball mill, to thereby prepare a ceramic slurry precursor.

An isocyanate and a polyol were mixed with the ceramic slurry precursor (containing 100 parts by weight of the zirconia powder) such that the urethane resin produced from the isocyanate and the polyol had a repeating-unit-based molecular weight and a content (by parts by weight) shown in Table 1; and the functional-group ratio of polyol to isocyanate (mole ratio of hydroxyl group to isocyanate group) was adjusted to a predetermined value (e.g., 2/11.5). 4,4'-Diphenylmethane diisocyanate was used as the isocyanate, and a solution prepared by dissolving poly(vinyl butyral) (10 wt. %) in the mixture of triacetin and the organic dibasic acid ester (1:9) serving as a solvent was used as the polyol. To the prepared mixture, 6-dimethylamino-1-hexanol (0.05 parts by weight) was added as a catalyst, and the resultant mixture was degassed in vacuum, to thereby produce a ceramic slurry.

The ceramic slurry was molded into sheets having a thickness of 200 μm, by means of a sheet-forming machine employing a doctor blade. After molding, the sheets were solidified and dried by heating at 40° C. for 2 hours in the sheet-forming machine. Thereafter, the sheets were solidified and dried indoors at ambient temperature for 12 hours, to thereby produce ceramic green sheets.

The thus-produced ceramic green sheets were evaluated in terms of plasticity and punching property. Plasticity was evaluated with the ratings "pass" (O) wherein a ceramic green sheet exhibited no cracks when bent to a radius of curvature of R25, and "fail" (X) wherein a ceramic green sheet exhibited a crack under the same bending. For the evaluation of punching property, each of the ceramic green sheets was punched into rectangular sheets having a size of 0.4×3.0 mm by means of a sheet-punching machine. A cross-section of each rectangular sheet developed by punching was observed. A rectangular sheet exhibiting no cracks or crushing was evaluated as "pass" (O), and a rectangular sheet exhibiting such defects was evaluated as "fail" (X).

Separately, each ceramic green sheet was punched into square sheets having a size of 70.0×70.0 mm, by means of a sheet-punching machine. The percent heat shrinkage of the square sheet was monitored and measured for a unit time during which the sheet was heated at 80° C. When a square sheet exhibited a percent heat shrinkage of less than 0.015%, the sample was evaluated as "pass" (O), and when a square sheet exhibited a percent heat shrinkage of 0.015% or higher, the sample was evaluated as "fail" (X).

The above-described evaluations were sequentially performed on sheet samples produced from urethane resins having a repeating-unit-based molecular weight with urethane resin contents (by parts by weight) shown in Table 3. Table 3 shows the evaluation results.

TABLE 3

| Sample No. | Mol. wt. | Evaluation items | Resin 4 parts by weight | Resin 7 parts by weight | Resin 10 parts by weight | Resin 12 parts by weight |
|---|---|---|---|---|---|---|
| 1 | 170 | Plasticity | X X | X X | X X | — — |
|   |   | Punching | — | — | — | — |
|   |   | Shrinkage* | — | — | — | — |
| 2 | 290 | Plasticity | X O | O O | O O | — — |
|   |   | Punching | X | O | O | — |
|   |   | Shrinkage* | — | O | O | — |
| 3 | 519 | Plasticity | X O | O O | O O | — — |
|   |   | Punching | X | O | O | — |
|   |   | Shrinkage* | — | O | O | — |
| 4 | 988 | Plasticity | X O | O O | O O | — — |
|   |   | Punching | X | O | O | — |
|   |   | Shrinkage* | — | O | O | — |
| 5 | 2000 | Plasticity | X O | X O | X O | — — |
|   |   | Punching | X | X | X | — |
|   |   | Shrinkage* | — | — | — | — |

*Shrinkage by heat

As shown in Table 3, the ceramic green sheet containing 12 parts by weight of the urethane resin based on 100 parts by weight of the ceramic powder was not tested for evaluation, since the ceramic green sheet had already been found to exhibit poor (unsatisfactory) sinterability during sintering due to excessively large inter-particle distance of the ceramic powder.

As is clear from Table 3, the plasticity, punching property, sinterability, and percent (heat) shrinkage were satisfactory in the case where urethane resins had a repeating-unit-based molecular weight falling within a range of 290 to 988 and the ratio by weight of the urethane resin to the ceramic powder fell within a range of 7 to 10 parts by weight of the urethane resin based on 100 parts by weight of the ceramic powder.

Table 4 shows the results of an experiment performed for evaluation on the range of functional-group ratio of the polyol to isocyanate (i.e., a mole ratio of hydroxyl group to isocyanate group), the range being required for satisfying all of the above-described properties for the formed urethane resin having a repeating-unit-based molecular weight of 988 and a weight ratio of the urethane resin to the ceramic powder falling within a range of 7 to 10 parts by weight of the urethane resin based on 100 parts by weight of the ceramic powder.

As shown in Table 4, no evaluation is performed for the case where the functional group ratio was 11.5:11.5, since an excessively long drying time is required. As shown in Table 4, all of the above-described properties are satisfactory for the cases where the functional-group ratio of the polyol to the isocyanate falls within a range of 2/11.5 to 5/11.5. The same experiment as described above was conducted for the urethane resins having a repeating-unit-based molecular weight of 290 or 519. All of the above-described properties are sufficient when the functional-group ratio of the polyol to the isocyanate falls within a range of 2/11.5 to 5/11.5.

TABLE 4

| | | | Functional-group ratio (isocyanate:polyol) | | | |
|---|---|---|---|---|---|---|
| | | | 11.5:1 | 11.5:2 | 11.5:5 | 11.5:11.5 |
| Amount of resin | 7 parts | Plasticity | X O | O O | O O | — — |
| | | Punching | X | O | O | — |
| | | Shrinkage* | — | O | O | — |
| | 8 parts | Plasticity | X O | O O | O O | — — |
| | | Punching | X | O | O | — |
| | | Shrinkage* | — | O | O | — |
| | 10 parts | Plasticity | X O | O O | O O | — — |
| | | Punching | X | O | O | — |
| | | Shrinkage* | — | O | O | — |

TABLE 4-continued

| | Functional-group ratio (isocyanate:polyol) | | | | | | | |
|---|---|---|---|---|---|---|---|---|
| | 11.5:1 | | 11.5:2 | | 11.5:5 | | 11.5:11.5 | |
| 11 parts | Plasticity | — | — | — | — | — | — | — | — |
| | Punching | | — | | — | | — | | — |
| | Shrinkage* | | — | | — | | — | | — |

*Shrinkage by heat

As described above, a ceramic green sheet having plasticity, punching property, and sinterability, all on satisfactory levels, and exhibiting a low percent (heat) shrinkage can be provided when the following conditions are satisfied: the functional-group ratio of the polyol to the isocyanate falls within a range of 2/11.5 to 5/11.5; the repeating-unit-based molecular weight of the urethane resin falls within a range of 290 to 988; and the ratio by weight of the urethane resin to the ceramic powder contained in the ceramic green sheet falls within a range of 7 to 10 parts by weight of the urethane resin based on 100 parts by weight of the ceramic powder. That is, under the above conditions, a ceramic green sheet exhibiting all the properties required for facilitating subsequent treatments of the ceramic green sheet can be provided.

Incidentally, experimental circumstances, such as method of drying, have been improved after the experiments, the evaluation results of which are shown in TABLEs 3 and 4, were conducted. Therefore, experiments similar to the experiments, the evaluation results of which are shown in TABLEs 3 and 4, have been conducted again. TABLEs 5 and 6 show the evaluation results. TABLEs 5 and 6 correspond to TABLEs 3 and 4, respectively.

TABLE 5

| Sample No. | Mol. wt. | Evaluation items | Resin 4 parts by weight | | Resin 4.5 parts by weight | | Resin 7 parts by weight | | Resin 10 parts by weight | | Resin 12 parts by weight | |
|---|---|---|---|---|---|---|---|---|---|---|---|---|
| 1 | 170 | Plasticity | X | X | X | X | X | X | X | X | — | — |
| | | Punching | | — | | — | | — | | — | | — |
| | | Shrinkage* | | — | | — | | — | | — | | — |
| 2 | 290 | Plasticity | X | ○ | ○ | ○ | ○ | ○ | ○ | ○ | — | — |
| | | Punching | | X | | ○ | | ○ | | ○ | | — |
| | | Shrinkage* | | — | | ○ | | ○ | | ○ | | — |
| 3 | 519 | Plasticity | X | ○ | ○ | ○ | ○ | ○ | ○ | ○ | — | — |
| | | Punching | | X | | ○ | | ○ | | ○ | | — |
| | | Shrinkage* | | — | | ○ | | ○ | | ○ | | — |
| 4 | 988 | Plasticity | X | ○ | ○ | ○ | ○ | ○ | ○ | ○ | — | — |
| | | Punching | | X | | ○ | | ○ | | ○ | | — |
| | | Shrinkage* | | — | | ○ | | ○ | | ○ | | — |
| 5 | 2000 | Plasticity | X | ○ | X | ○ | X | ○ | X | ○ | — | — |
| | | Punching | | X | | X | | X | | X | | — |
| | | Shrinkage* | | — | | — | | — | | — | | — |

*Shrinkage by heat

TABLE 6

| | | | Functional-group ratio (isocyanate:polyol) | | | | | | | | | | | |
|---|---|---|---|---|---|---|---|---|---|---|---|---|---|---|
| | | | 11.5:1 | | 11.5:1.5 | | 11.5:2 | | 11.5:5 | | 11.5:11.5 | | 11.5:23 | |
| Amount of resin | 4.5 parts | Plasticity | X | ○ | ○ | ○ | ○ | ○ | ○ | ○ | ○ | ○ | — | — |
| | | Punching | | X | | ○ | | ○ | | ○ | | ○ | | — |
| | | Shrinkage* | | — | | ○ | | ○ | | ○ | | ○ | | — |
| | 7 parts | Plasticity | X | ○ | ○ | ○ | ○ | ○ | ○ | ○ | ○ | ○ | — | — |
| | | Punching | | X | | ○ | | ○ | | ○ | | ○ | | — |
| | | Shrinkage* | | — | | ○ | | ○ | | ○ | | ○ | | — |
| | 8 parts | Plasticity | X | ○ | ○ | ○ | ○ | ○ | ○ | ○ | ○ | ○ | — | — |
| | | Punching | | X | | ○ | | ○ | | ○ | | ○ | | — |
| | | Shrinkage* | | — | | ○ | | ○ | | ○ | | ○ | | — |
| | 10 parts | Plasticity | X | ○ | ○ | ○ | ○ | ○ | ○ | ○ | ○ | ○ | — | — |
| | | Punching | | X | | ○ | | ○ | | ○ | | ○ | | — |
| | | Shrinkage* | | — | | ○ | | ○ | | ○ | | ○ | | — |
| | 11 parts | Plasticity | — | — | — | — | — | — | — | — | — | — | — | — |
| | | Punching | | — | | — | | — | | — | | — | | — |
| | | Shrinkage* | | — | | — | | — | | — | | — | | — |

*Shrinkage by heat

TABLE 5 is different from TABLE 3 only in an aspect that the case of 4.5 parts by weight of the urethane resin is added. The fact that the case of 4.5 parts by weight of the urethane resin is added is based on the fact that experiments for a range of 4-7 parts by weight of the urethane resin have been able to be conducted because of the improvement of the experimental circumstances. All of detailed experimental conditions except for this different point are the same as the case of the experiment, the evaluation results of which are shown in TABLE 3. Notably, a reason why an evaluation for the case of 12 parts by weight of the urethane resin was not conducted in TABLE 5 is the same as the reason described for the case of the experiment, the evaluation results of which are shown in TABLE 3.

As is clear from TABLE 5, in the experiment that has been conducted after the improvement of the experimental circumstances, the plasticity, punching property, sinterability, and percent (heat) shrinkage were satisfactory in the case where urethane resins had a repeating-unit-based molecular weight falling within a range of 290 to 988 and the ratio by weight of the urethane resin to the ceramic powder fell within a range of 4.5 to 10 parts by weight of the urethane resin based on 100 parts by weight of the ceramic powder.

TABLE 6 is different from TABLE 4 only in aspects that the case of 4.5 parts by weight of the urethane resin is added and that the cases of the functional-group ratio of the polyol to the isocyanate of 1.5/11.5 and 23/11.5 are added. The fact that the cases of the functional-group ratio of the polyol to the isocyanate of 1.5/11.5 and 23/11.5 are added is based on the fact that experiments for the functional-group ratio of the polyol to the isocyanate of a range of 1.5/11.5 to 11.5/11.5 have been able to be conducted because of the improvement of the method of drying. All of detailed experimental conditions except for these different points are the same as the case of the experiment, the evaluation results of which are shown in TABLE 4. Notably, no evaluation is performed for the case where the functional group ratio was 11.5:23, since an excessively long drying time is required.

As is clear from TABLE 6, in the experiment that has been conducted after the improvement of the experimental circumstances, all of the above-described properties are satisfactory for the cases where the functional-group ratio of the polyol to the isocyanate falls within a range of 1.5/11.5 to 11.5/11.5. The same experiment as described above was conducted for the urethane resins having a repeating-unit-based molecular weight of 290 or 519. All of the above-described properties are sufficient when the functional-group ratio of the polyol to the isocyanate falls within a range of 1.5/11.5 to 11.5/11.5.

As described hereinabove, as is clear from TABLEs 5 and 6 relative to TABLEs 3 and 4, the ranges of the conditions where all of the above-described properties are satisfactory have been expanded because of the improvement of the experiment circumstances. Specifically, a ceramic green sheet having plasticity, punching property, and sinterability, all on satisfactory levels, and exhibiting a low percent (heat) shrinkage can be provided when the following conditions are satisfied: the functional-group ratio of the polyol to the isocyanate falls within a range of 1.5/11.5 to 11.5/11.5; the repeating-unit-based molecular weight of the urethane resin falls within a range of 290 to 988; and the ratio by weight of the urethane resin to the ceramic powder contained in the ceramic green sheet falls within a range of 4.5 to 10 parts by weight of the urethane resin based on 100 parts by weight of the ceramic powder.

What is claimed is:

1. A method for producing a ceramic green body molded into a predetermined shape, the method comprising:
    mixing a ceramic powder, an isocyanate, a polyol, a temperature-sensitive catalyst that exhibits a catalyst function for accelerating a urethane reaction between the isocyanate and the polyol within a predetermined temperature range, wherein a catalyst-reaction speed of the temperature sensitive catalyst becomes a maximum within a temperature range of 55° C.-120° C., and a solvent to prepare a ceramic slurry containing the ceramic powder, the unreacted isocyanate, the unreacted polyol, the temperature-sensitive catalyst and the solvent;
    molding the prepared ceramic slurry into a predetermined shape at room temperature; and
    forming a urethane resin through the urethane reaction between the unreacted isocyanate and the unreacted polyol in the molded product so as to solidify the molded product, and drying the molded product so as to evaporate the solvent, at the temperature within the 55° C.-120° C. temperature range through the application of heat to the molded product,
    wherein the polyol is selected from the group consisting of polyethylene glycol, propylene glycol, polypropylene glycol, polytetramethylene glycol, polyhexamethylene glycol, and polyvinyl butyral.

2. A method of producing a ceramic green body according to claim 1, wherein the ceramic slurry prepared in large quantity is stored in a predetermined vessel at room temperature; and
    a small amount of the ceramic slurry is taken out, when needed, from the vessel in a required amount for the molding of the ceramic slurry and the solidification and drying of the molded product, in order to mass-produce the ceramic green body.

3. A method of producing a ceramic green body according to claim 1, wherein the temperature-sensitive catalyst is added to the ceramic slurry in an amount within the range of 0.15 to 1.0 parts by weight based on 100 parts by weight of the ceramic powder.

4. A method of producing a ceramic green body according to claim 1, wherein the ceramic green body is a plate-like ceramic green sheet having a thickness of 4 mm or less.

5. A method of producing a ceramic green body according to claim 1, wherein the ceramic slurry further comprises a urethane resin serving as a binder.

* * * * *